(12) United States Patent
Shuey et al.

(10) Patent No.: US 9,287,926 B2
(45) Date of Patent: Mar. 15, 2016

(54) DIGITAL RECEIVER PERFORMANCE IN THE PRESENCE OF IMAGE FREQUENCIES

(71) Applicant: Elster Solutions, LLC, Raleigh, NC (US)

(72) Inventors: Kenneth C. Shuey, Zebulon, NC (US); Rodney C. Hemminger, Raleigh, NC (US); John R. Holt, Wake Forest, NC (US); Brent Brian, Clayton, NC (US)

(73) Assignee: Elster Solutions, LLC, Raleigh, NC (US)

( * ) Notice: Subject to any disclaimer, the term of this patent is extended or adjusted under 35 U.S.C. 154(b) by 176 days.

(21) Appl. No.: 14/051,116

(22) Filed: Oct. 10, 2013

(65) Prior Publication Data

US 2014/0098838 A1    Apr. 10, 2014

Related U.S. Application Data (60) Provisional application No. 61/711,930, filed on Oct. 10, 2012.

(51) Int. Cl.
*H04B 1/00*    (2006.01)
*H04B 1/7156*  (2011.01)
*H04B 1/715*   (2011.01)

(52) U.S. Cl.
CPC .............. *H04B 1/7156* (2013.01); *H04B 1/715* (2013.01)

(58) Field of Classification Search
CPC ......... H04L 27/38; H04L 5/06; H04L 5/0053; H04B 1/713; H04B 1/715
See application file for complete search history.

(56) References Cited

U.S. PATENT DOCUMENTS

| | | | | |
|---|---|---|---|---|
| 5,025,455 | A * | 6/1991 | Nguyen | 375/327 |
| 5,668,828 | A * | 9/1997 | Sanderford et al. | 375/136 |
| 6,031,883 | A * | 2/2000 | Sanderford et al. | 375/344 |
| 6,377,782 | B1 * | 4/2002 | Bishop | H04L 12/2801 370/277 |
| 6,970,434 | B1 | 11/2005 | Mahany et al. | |
| 7,477,694 | B2 * | 1/2009 | Sanderford et al. | 375/261 |
| 2002/0039380 | A1 * | 4/2002 | Steed et al. | 375/132 |
| 2002/0109607 | A1 * | 8/2002 | Cumeralto et al. | 340/870.02 |
| 2004/0001531 | A1 | 1/2004 | Shuey et al. | |
| 2004/0001532 | A1 * | 1/2004 | Mason, Jr. | H04B 1/7156 375/136 |
| 2012/0252394 | A1 * | 10/2012 | Balakrishnan et al. | 455/313 |

FOREIGN PATENT DOCUMENTS

WO    WO 2010/070537 A1    6/2010

* cited by examiner

*Primary Examiner* — Daniel Washburn
*Assistant Examiner* — Amneet Singh
(74) *Attorney, Agent, or Firm* — Baker & Hostetler LLP (57) ABSTRACT

A digital Radio Frequency (RF) receiver may exhibit image frequencies and these image frequencies may be mathematically related to the intermediate frequency (IF) that is utilized for transmission and reception. In accordance with an embodiment, channel switching may be performed to identify an appropriate receive frequency in the presence of image frequencies on other channels. In accordance with another embodiment, data on a receive channel is evaluated to determine whether the data is inverted, and then appropriate correction may be performed on subsequently received data.

16 Claims, 8 Drawing Sheets

DIGITAL RECEIVER PERFORMANCE IN THE PRESENCE OF IMAGE FREQUENCIES

CROSS-REFERENCE TO RELATED APPLICATIONS

This application claims benefit under 35 U.S.C. §119(e) of Provisional U.S. patent application No. 61/711,930, filed Oct. 10, 2012, the disclosure of which is hereby incorporated by reference as if set forth in its entirety herein.

BACKGROUND

A digital Radio Frequency (RF) receiver may exhibit image frequencies and these image frequencies may be mathematically related to the intermediate frequency (IF) that is utilized for transmission and reception. The IF may refer to a frequency to which the received signal is converted. For example, the IF may be more conveniently processed than the original radio carrier frequency. In an example multi-hop system, image frequencies or channels may exist at the desired receive frequency plus two or three times the IF when the receiver uses a low value of IF in the system. Valid and invalid messages can exist on these image channels and the existence of these image channels can interfere with optimum receiver performance.

SUMMARY

Systems, methods, and apparatus embodiments are described for handling the presence of image frequencies in a multi-hop communication system to avoid degradation in receiver performance. In one embodiment, a receiver receives a message that is transmitted on one of a plurality of channels of a hop sequence of a multi-hop communication system. Each channel has an associated frequency. For example, when a message is transmitted on one channel of the hop sequence, other channels of the sequence may exhibit images of the message. In accordance with the embodiment, a plurality of channels in the hop sequence are scanned. For each of the scanned channels, a value that is indicative of signal strength may be determined. One of the channels having a signal strength value that satisfies a threshold is selected. The selected channel is evaluated in an attempt to detect a preamble of a message on that channel. If the preamble is detected on the selected channel, the receiver is tuned to a second channel in the hop sequence and the second channel is evaluated in an attempt to detect the preamble on that second channel. If no preamble is detected on the second channel, the receiver is tuned back to the selected channel and a remainder of the message on that selected channel is received. If the preamble is detected on the second channel, then the receiver is maintained tuned to the second channel and the remainder of the message on that second channel is received. Thus, in accordance with an embodiment, channel switching may be performed to identify an appropriate receive frequency in the presence of image frequencies on other channels.

In another example embodiment, a receiver receives a message that is transmitted on one of a plurality of channels of a hop sequence of a multi-hop communication system. When a message is transmitted on one channel of the hop sequence, other channels may exhibit images of the message in which the bits of the message may be inverted. In accordance with the embodiment, one of the channels is selected. A preamble of a message on the selected channel is detected. From a characteristic of the preamble, it may be determined that data of the message is inverted on the selected channel. The data of the message may continue to be received, but the received data is inverted to recover the message. For example, the preamble may comprise a pattern of Manchester encoded "0" bits followed by a pattern of Manchester encoded "1" bits, wherein a transition from "0" bits to "1" bits exhibits a double-wide sequence of low signal values, and wherein the characteristic from which it is determined whether the data on the channel is inverted is the double-wide sequence of signal values at the transition. Thus, in accordance with an embodiment, the data on a receive channel is evaluated to determine whether the data is inverted, and then appropriate correction may be performed on subsequently received data.

Other features of the described embodiments will become apparent from the following detailed description and accompanying drawings.

DETAILED DESCRIPTION OF ILLUSTRATIVE EMBODIMENTS

The ensuing detailed description provides example embodiments and is not intended to limit the scope, applicability, or configuration of the invention. Various changes may be made in the function and/or arrangement of elements and steps without departing from the spirit and scope of the invention.

A digital radio frequency (RF) receiver may exhibit image frequencies and these images may be mathematically related to the intermediate frequency (IF) that is utilized. An image frequency resulting from low side injection, for example, may exist at the desired receive frequency plus two times the IF (See equation 1). By way of another example, the image may exist at the desired frequency plus three times the IF frequency (See equation 2). It will be appreciated that an image frequency may at exist at various other frequencies or channels, for example, depending on the magnitude of the IF and the separation of hop channels. By way of yet another example, but without limitation, an image frequency may exist at the desired frequency plus five times the IF.

$$F_{Image} = f_{RF} \pm 2 f_{IF}, \quad (1)$$

where $f_{RF}$ is the desired signal and $F_{Image}$ is the undesired signal.

$$F_{Image} = f_{RF} \pm 3 f_{IF}, \quad (2)$$

where $f_{RF}$ is the desired signal and $F_{Image}$ is the undesired signal.

When a receiver uses a low value of IF in a multi-hop system (e.g., a frequency hopping spread spectrum (FHSS) communication system), image frequencies may exist within the desired receive spectrum. When an image is located on one of the hop channels, for example, the data may be valid or the data may be inverted. A good message may result, for example, when the signal strength is strong and the data is valid on an image channel. A bad message may result, for example, if the signal is strong and the data is inverted on the image channel.

By way of an example in which a non-synchronous system is used, any of the hop channels may have a valid signal thereon and a receiver may establish self-synchronization with the transmitted message. For example, a scanning receiver may look for strong signal strength and then may evaluate the strong signal for a valid preamble. The preamble may be then followed until the Start Frame Delimiter (SFD). An invalid message may result if the bits are inverted in the preamble and the preamble is followed until the SFD.

By way of an example in which a synchronous system is used, there may be a period in which synchronization is lost and image frequencies with inverted data cause re-synch issues and delays in bringing the system back up to quality operation.

Various embodiments for handling inverted image signals on hop channels of a multi-hop communication system are described herein. For purposes of illustrating example embodiments, a multi-hop communication system in which 31 hop channels are spaced at 400 kHz intervals may be considered. The image frequencies in such a system may appear at the desired channel plus two channels. Thus, for example, a transmission on channel 11 in the example multi-hop communication system would have a valid signal on channel 11 and an image on channel 13. By way of further example, an image may appear on a channel plus three channels away from the transmitted channel when the transmitting channel has positive frequency offset with respect to the receiver. This level of frequency offset, for example, may occur in devices with older clocks (e.g., with maximum drift) talking to newer devices with better clocks.

In accordance with an example embodiment, a receiver scans at least some, for instance all, hop channels in a multi-hop communication system. The scan may comprise a Received Signal Strength Indication (RSSI) scan of the hop channels in the system. For example, the RSSI scan may be a "down scan" that starts with the highest-numbered channel (e.g., channel 31) and ends with the lowest-numbered channel (e.g., channel 1). When the RSSI scan is complete, an RSSI scan list may be established that lists channels and their associated RSSI magnitudes. Channels may be ranked based on their RSSI magnitudes. For example, out of the RSSI scan list, 12 channels may be ranked for preamble evaluation in a preamble evaluation list. Although 12 channels are described herein for purposes of example, it will be appreciated that more or fewer channels may be selected for the preamble evaluation list. For example, a total of seven channels may be ranked for preamble evaluation in a preamble evaluation list.

During preamble evaluation, in accordance with an example embodiment, pattern matching is used to determine if a valid preamble at the desired data rate is present on any of the channels in the preamble evaluation list. When a valid preamble is detected, the channel may be maintained as long as the preamble remains valid. For example, the preamble may be followed (e.g., tracked by the receiver) until an SFD is encountered. The transmitted preamble length may be sufficiently long to allow the receiver to complete an RSSI scan and a preamble evaluation, and then repeat the RSSI scan and the preamble evaluation, although it will be understood the preamble lengths may vary as desired. In accordance with one example scenario in which a valid preamble is not detected within the channels in the preamble evaluation list in a first RSSI list, at least one other RSSI scan and preamble evaluation are executed.

Figure 1:
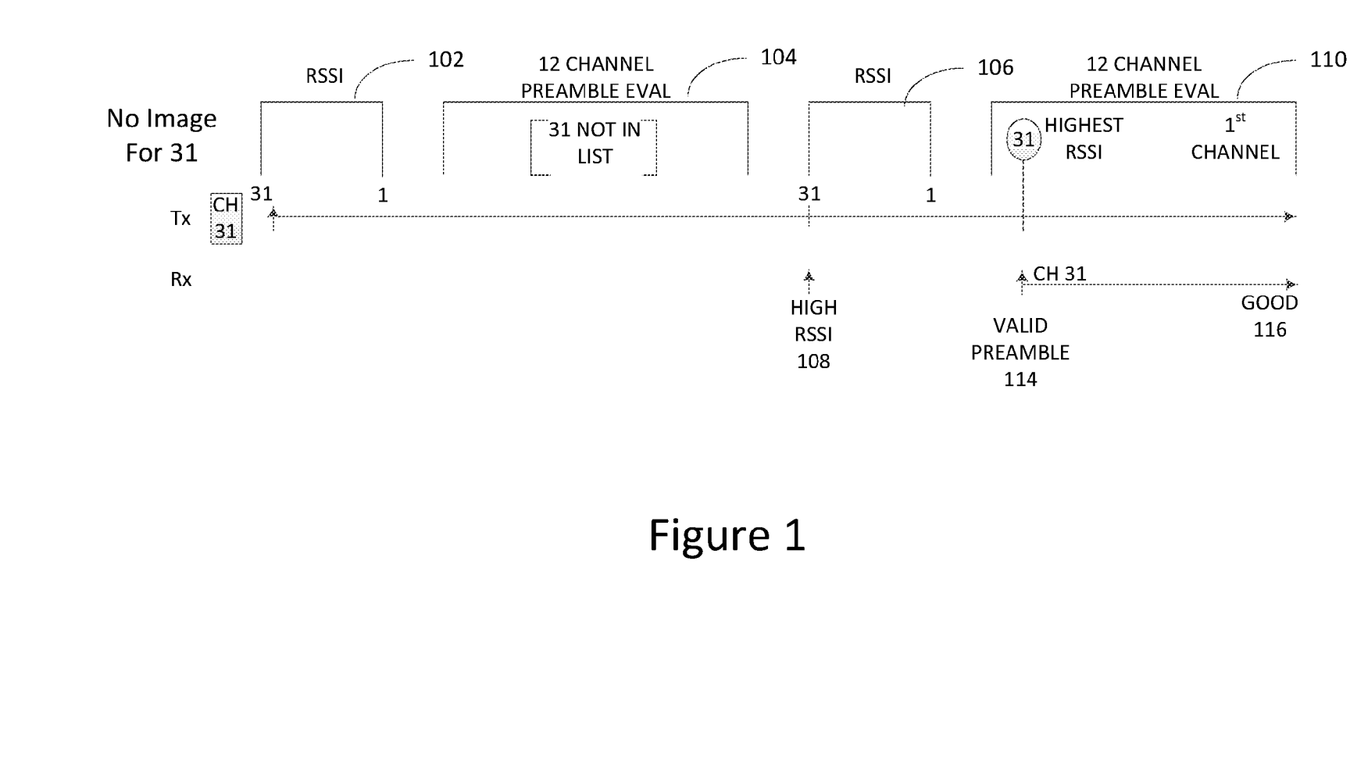
FIG. 1 illustrates one example of receiving a message on a channel of a multi-hop communication system.
Figure 2:
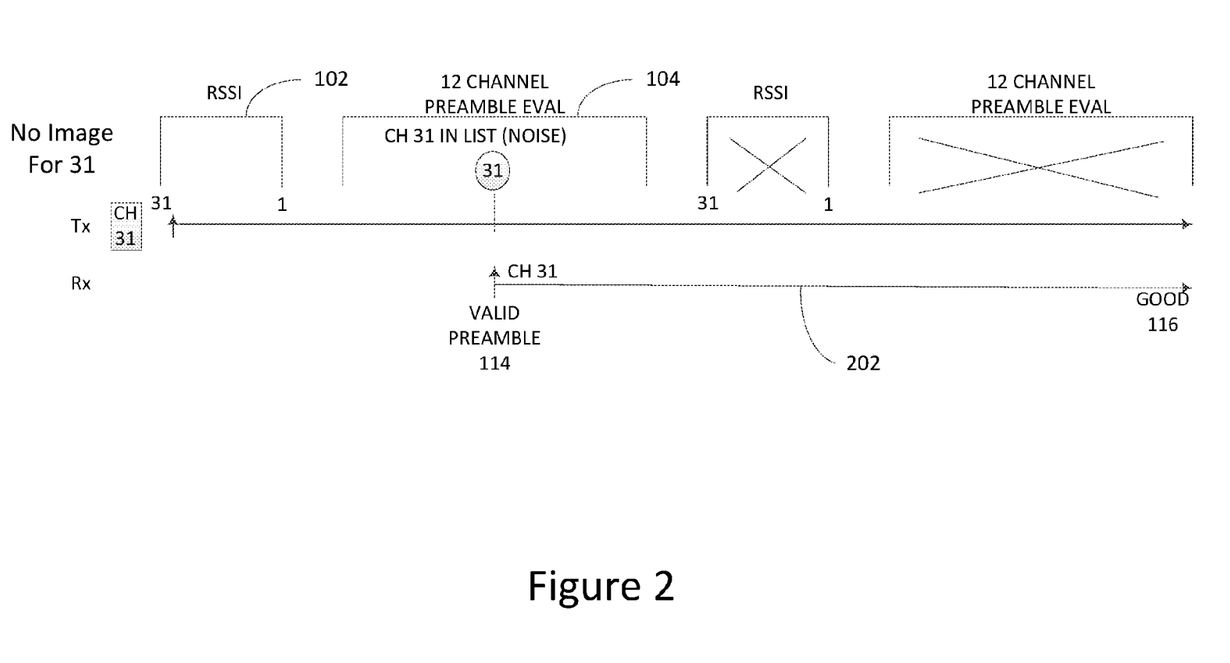
FIG. 2 illustrates another example of receiving a message on a channel of a multi-hop communication system.
Figure 3:
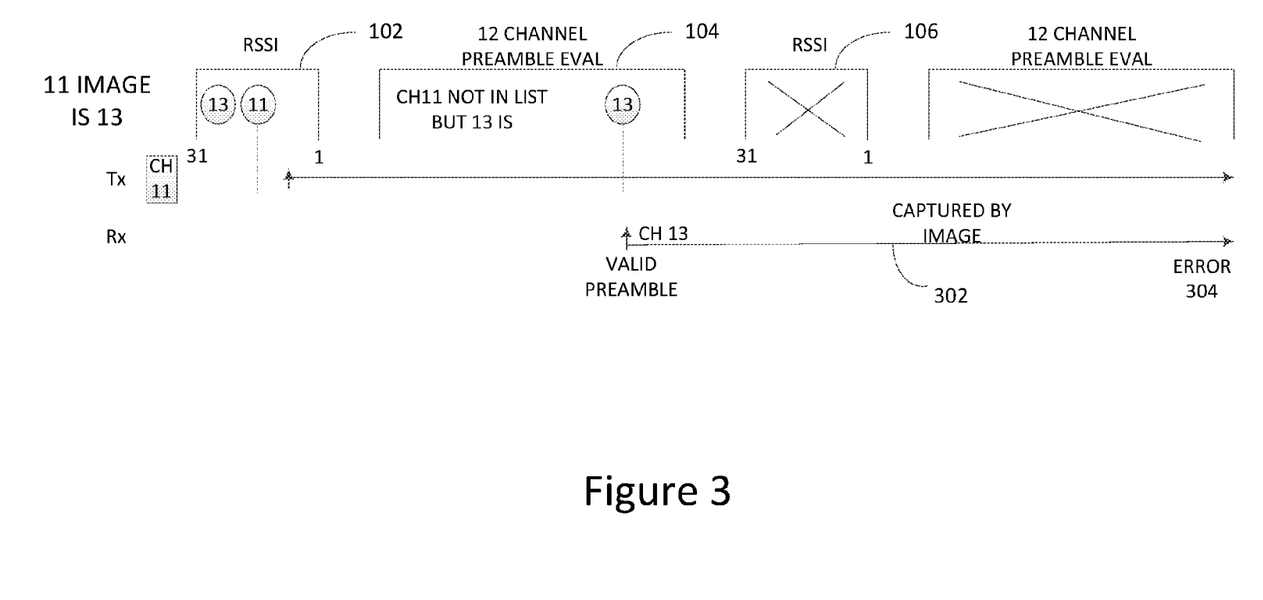
FIG. 3 illustrates yet another example of receiving a message on a channel of a multi-hop communication system, where the reception results in an error due to the presence of image frequencies.

FIGS. 1-3 illustrate various examples of signals that may be received on hop channels by a receiver constructed in accordance with an example embodiment. It will be understood that signals may also be referred to as messages herein without limitation unless otherwise stated. Referring to FIG. 1, a message is transmitted on a last channel (e.g., channel 31) in a list of hop channels that comprises channels 1 to 31. Because channel 31 is the last channel in the illustrated list of hop channels, it does not have any image frequencies that are receivable because channel 33 (channel 31+2 channels) is outside the hop sequence. In the example depicted in FIG. 1, the transmission on channel 31 occurs after channel 31 has been RSSI scanned. Thus, a first RSSI scan 102 does not detect the transmit RSSI level, and a level of noise may be detected at channel 31. In this example, the level of noise does not place channel 31 in a first preamble evaluation list so channel 31 is not evaluated for preamble during a first preamble evaluation 104. While the illustrated preamble evaluation lists include 12 channels, it will be understood that the number of channels in a preamble evaluation list may vary as desired. Because no image channel exists in the example depicted in FIG. 1, the first preamble evaluation ends without a valid preamble being detected and the receiver goes back to RSSI scanning at a second RSSI scan 106.

As further illustrated in FIG. 1, during the second RSSI scan 106, it is detected that channel 31 has a high RSSI 108. Thus, channel 31 is discovered and included in a second preamble evaluation list that is evaluated during a second preamble evaluation 110. The channel 31 may have a highest RSSI 112 of the channels in the second preamble evaluation list. By way of example, still referring to FIG. 1, channel 31 may not have the highest RSSI 112 in the second preamble evaluation list if the system is in a noisy environment for example, but channel 31 may be the channel that has the highest RSSI 112 while also having a valid preamble 114. As FIG. 1 illustrates, during the preamble evaluation 110 of the second preamble evaluation list, channel 31 exhibits the valid preamble 114 and the channel 31 preamble is followed until the SFD, resulting in a good message 116.

FIG. 2 illustrates an example scenario that is similar to the scenario depicted in FIG. 1, but in FIG. 2 the noise level for channel 31 places channel 31 in the first preamble evaluation list selected from the first RSSI scan 102. When the preamble of channel 31 is evaluated at 104, the preamble is found to be valid and channel 31 is then followed at 202 until the SFD, which results in receiving the good message. Thus, as illustrated in FIG. 1 and FIG. 2, transmitting in the last channel in the list of hop channels, without image frequencies, may result in a good message.

Referring to the example depicted in FIG. 3, a message is transmitted on channel 11 after channel 11 and channel 13 are scanned during the first RSSI scan 102. As further illustrated, the noise level on channel 11 does not place it in the first preamble evaluation list, but the noise signal on channel 13 is sufficient to result in channel 13 being included in the first preamble evaluation list such that channel 13 is evaluated during the first preamble evaluation 104. Such a scenario may be referred to as a random probability situation. Because the image signal on channel 13 may include a valid preamble, as illustrated at 302, the receiver may capture the image preamble and may follow the preamble until the SFD. But the SFD in this situation may fail due to inverted bit definitions, which may result in a missed packet or an error 304. In this example, there may not be sufficient time for the second RSSI scan 106 to evaluate the correct channel (channel 11) after chasing the preamble until the SFD on the erroneous image channel 13.

In one embodiment, a receiver handles the presence of image signals appearing on valid channels in a hop sequence by recognizing that an image signal may occur on other channels. For example, the receiver may recognize that the image channel may occur two channels higher in the hop sequence than a desired channel or three channels higher in the hop sequence than the desired channel. In accordance with an example embodiment, referring to FIG. 4 described below, a receiver switches channels in an attempt to detect those images and to find the appropriate channel on which a transmission is occurring. Thus, the receiver may receive a message on one of a plurality of channels of a hop sequence of a multi-hop communication system. In accordance with one embodiment, each channel has an associated frequency that is spaced from the frequency of a next channel in the hop sequence by a same interval. For example, the channels may be spaced apart by 400 kHz, although it will be understood that the intervals between channels in a hop sequence may vary as desired.

In accordance with an example embodiment, a receiver may scan a plurality of channels in a hop sequence. For each of the scanned channels, a value indicative of signal strength may be determined. For example, the RSSI of each channel may be determined. One of the channels may be selected that has a signal strength that satisfies (e.g., meets or exceeds) a threshold. The selected channel may be evaluated in an attempt to detect a preamble of a message on that channel. For example, the receiver may detect and select a channel "f" with a valid preamble. The receiver may determine whether the selected channel is actually an image.

In accordance with one embodiment, at least one other channel is evaluated after the selected channel is evaluated. If the valid preamble is detected on the selected channel, the receiver may be tuned to a second channel in the hop sequence and the second channel may be evaluated in an attempt to detect that preamble on that second channel. For example, a channel that is two channels (two hops) below the channel "f" on which the valid preamble was first detected (e.g., f-2 channel) may be evaluated. As used herein, the "f-2" channel may refer to a channel that is two hops away (in a hop sequence) from the channel f that is first selected. If the valid preamble is detected on the second channel, the receiver may be maintained as tuned to the second channel and the remainder of the message on the second channel may be received. For example, if upon evaluating the f-2 channel, it is determined that the f-2 channel also exhibits a valid preamble, then it may be determined that channel f is exhibiting an image and that channel f-2 is the desired channel. In such a situation, the receiver may lock onto channel f-2 and continue evaluating the preamble on that channel to the SFD. If no valid preamble is detected on the second channel, the receiver may be tuned back to the selected channel and a remainder of the message may be received on the selected channel. Alternatively, if no valid preamble is detected on the second channel, the receiver may be tuned to a third channel in the hop sequence and the third channel may be evaluated in an attempt to detect the preamble on that third channel. For example, if it is determined that the f-2 channel does not have a valid preamble, the receiver may then be tuned to yet another channel, for example the f-3 channel, to determine whether a valid preamble exists on that channel. As used herein, the "f-3" channel may refer to a channel that is two three hops away (in a hop sequence) from the channel f.

If the valid preamble is detected on the third channel, the receiver may be maintained as tuned to the third channel and the remainder of the message may be received on the third channel. For example, if the f-3 channel does have a valid preamble, then it may be determined that channel f is actually exhibiting an image and that channel f-3 is actually the desired channel. The receiver may then lock onto channel f-3 and follow the preamble to the SFD. Alternatively, if no valid preamble is detected on the third channel, the receiver may be tuned back to the selected channel and a remainder of the message may be received on that selected channel. Thus, if neither f-2 nor f-3 are found to have a valid preamble, then the receiver may determine that the original channel f is in fact the desired channel, and the receiver may switch back (tune) to that channel and follow the preamble on that channel to SFD. Thus, in an example embodiment, after detecting a valid preamble on an initial channel f, the receiver switches to one or more other channels (e.g., f-2 and f-3) in an attempt to determine whether the initial channel f is the actual transmission channel or whether it is merely exhibiting an image signal. The frequency of the channel that the receiver tunes to after detecting the valid preamble on the initial channel f may be two hops away from the initial channel f in the hop sequence. The receiver may tune to a channel that is three hops away from the initial channel in the hop sequence after evaluating the channel that is two hops away from the initial channel f in the hop sequence. It will be understood that the receiver may tune to other channels as desired. The receiver may then switch to (or back to) the channel it determines to be the one with the actual transmission.

Figure 4:
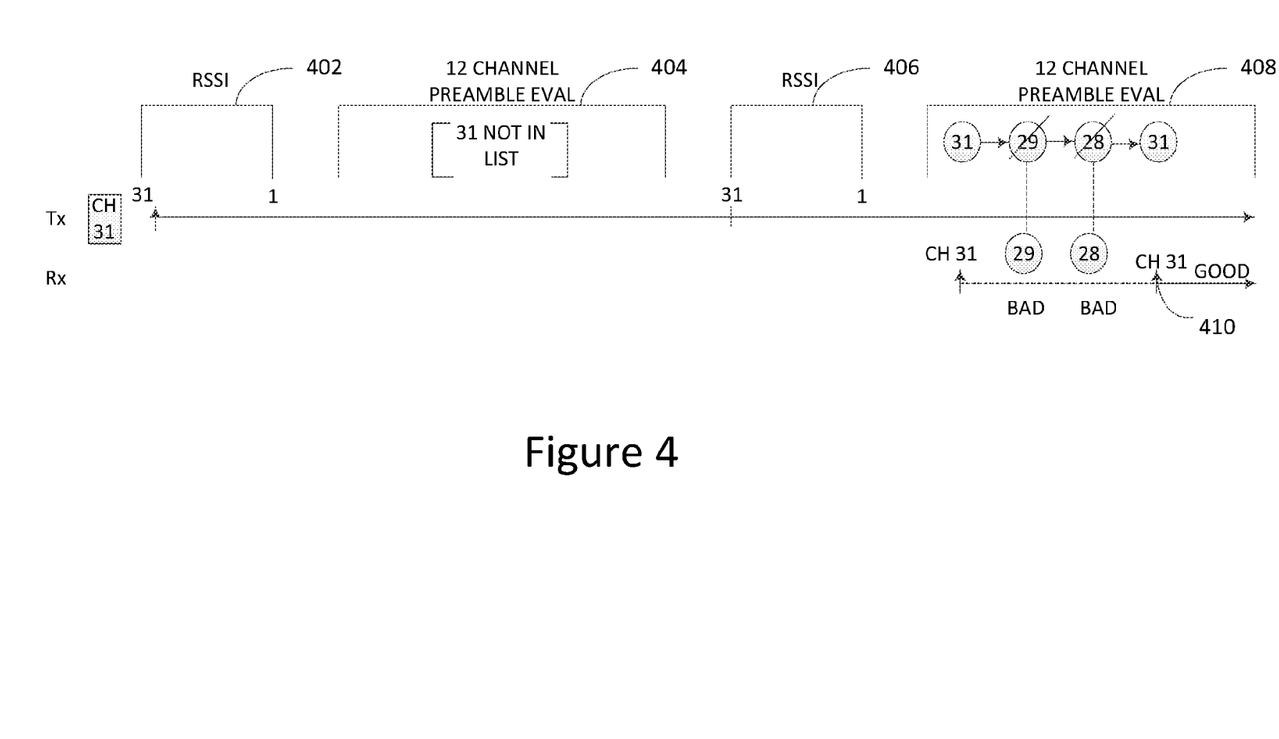
FIG. 4 illustrates one example of receiving a message in a multi-hop communication system in accordance with one embodiment of a method for handling the presence of image frequencies.

Referring to the illustrated embodiment depicted in FIG. 4, the transmission is on channel 31. Because channel 31 is the last channel in the illustrated hop list, it may not have any images that are receivable, for example, because channel 33 and channel 34 are out of range. As illustrated in FIG. 4, the example transmission on channel 31 occurs after channel 31 has been scanned in the first RSSI scan 402. Therefore, the threshold RSSI level for transmissions is not detected on channel 31, but rather a level of noise is recorded for channel 31. As illustrated in FIG. 4, the noise value for channel 31 does not place it in a first preamble evaluation list so it is not evaluated for a valid preamble during a first preamble evaluation 404. In this example, since no image channel exists in the evaluation list, the preamble evaluation ends with no channel detected and the receiver goes back to RSSI scanning at 406.

As further illustrated in FIG. 4, on the next RSSI scan 406, channel 31 is found and is the highest RSSI channel to be evaluated at 408. It is possible, for example in a noisy environment that channel 31 is not the channel with the highest RSSI, but it may be the channel with the highest RSSI that also has a valid preamble. With continuing reference to FIG. 4, during the preamble evaluation 408, channel 31 exhibits a valid preamble. According to the channel-switching embodiments described above, the receiver may switch to another channel in an attempt to determine whether channel 31 is merely exhibiting an image signal. In accordance with one embodiment described above, for example, the receiver may first tune to a channel that is two hops away from channel 31 (channel 29, f-2) and a preamble evaluation is that channel at 408. In accordance with the illustrated example, the receiver does not find a valid preamble on channel 29. In accordance with the illustrated embodiment, the receiver tunes (switches) to yet another channel in a further attempt to determine whether the initial channel f (channel 31) is merely exhibiting an image signal. In the illustrated example, the receiver switches to channel 28 (e.g., f-3) and performs a preamble evaluation on that channel at 408. Because the actual transmission is in fact occurring on channel 31 according to the illustrated example, the receiver does not detect a valid preamble on channel 28. Consequently, the receiver determines that channel 31 is the desired transmission channel and tunes to that channel to proceed with the preamble, at 410, until the SFD is detected. In this case, a valid packet may be received on channel 31.

Figure 5:
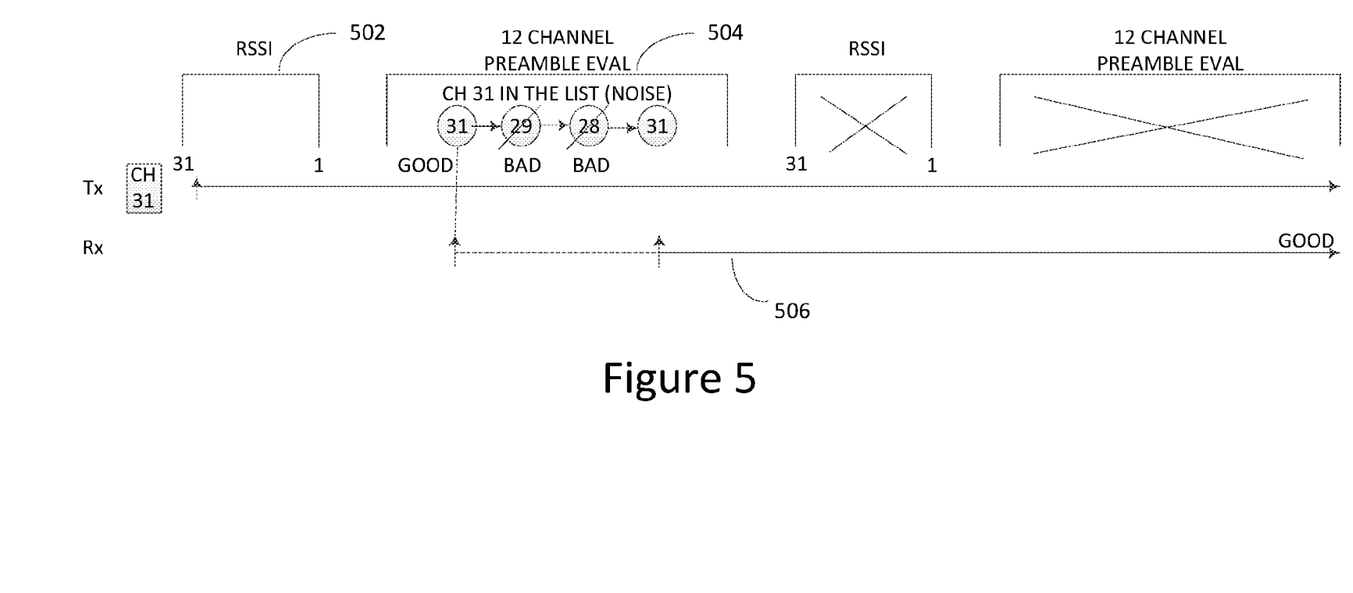
FIG. 5 illustrates another example of receiving a message in a multi-hop communication system in accordance with the method for handling the presence of image frequencies illustrated in FIG. 4.

FIG. 5 illustrates another example application of the channel-switching embodiments described above. Referring to FIG. 5, a transmission on channel 31 starts after channel 31 has already been scanned in a first RSSI scan 502. However, in this example, the noise level resulting from the RSSI scan 502 results in channel 31 being placed in the first preamble evaluation list. The preamble of channel 31 is thus detected when channel 31 is evaluated at 504. From there, the process may proceed as described above with reference to FIG. 4. For example, after the receiver tunes to channel 29 that is two hops from channel 31 in the hop sequence and determines that channel 29 does not include a preamble, the receiver may tune to channel 28 that is three hops from the channel 31 in the hop sequence. The receiver may determine that channel 28 does not include the preamble, and thus the receiver may determine that channel 31 is the desired channel. Thus, at 506, the receiver may tune to that channel (channel 31) to follow the preamble to the SFD, which may result in the reception of a good packet.

Figure 6:
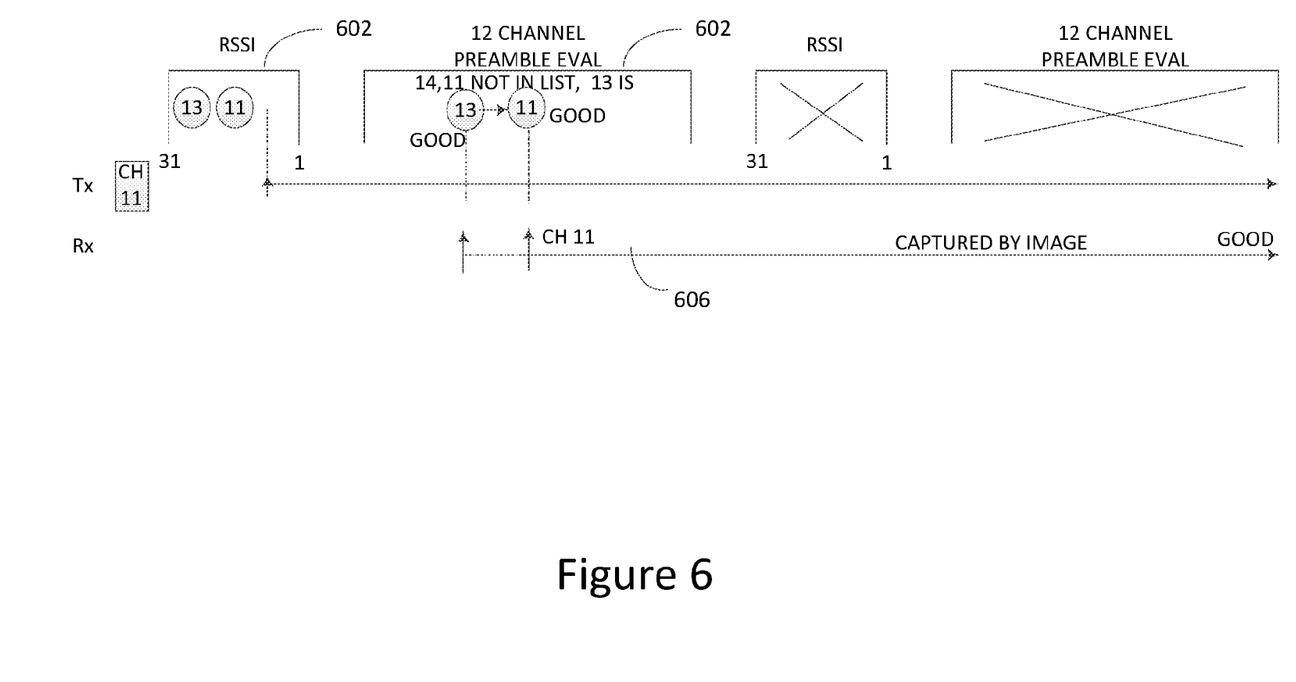
FIG. 6 illustrates yet another example of receiving a message in a multi-hop communication system in accordance with the method for handling the presence of image frequencies illustrated in FIG. 4.

FIG. 6 illustrates yet another application of the channel-switching embodiments described above. In the illustrated example, channel 13 exhibits an image. Referring to FIG. 6, a transmission starts on channel 11 after channel 11 and channel 13 have been scanned in a first RSSI scan 602. As a result, neither channel is placed on the resulting RSSI scan list that is first evaluated for valid preambles at 604. By way of example, it may be assumed that the noise level on channel 11 does not place it in the first preamble evaluation list, but the noise level on channel 13 does put channel 13. Continuing with this example, when the image signal on channel 13 is evaluated for a preamble at 604, the receiver detects a preamble on that channel. In accordance with various embodiments described above, the receiver may tune to channel 11 (f-2) in an attempt to determine whether channel 13 is the actual transmission channel or whether channel 13 exhibits an image. When channel 11 is then evaluated for a preamble at 604, the receiver detects the valid preamble on channel 11 because it is the actual transmission channel in accordance with the illustrated example. The receiver may then determine that channel 13 is exhibiting an image. At 606, the receiver may remain locked on channel 11 and may follow the preamble to the SFD, resulting in a reception of a good packet on channel 11. In accordance with the illustrated example, the receiver does not evaluate channel 10 (f-3) because the preamble evaluation at f-2 (channel 11) found a valid preamble.

As described above, in various other embodiments, the receiver may switch (tune) to different channels than channels that are two hops away (e.g., f-2) from an initial channel in a hop sequence and channels that are three hops away (e.g., f-3) from an initial channel in a hop sequence. It will further be understood that channels may be scanned in any order as desired. For example, a receiver may tune to other channels depending upon the likelihood of where in a given hop sequence image frequencies are likely to manifest. It will be further understood that a receiver may tune to any number of frequencies (e.g., one, two, greater than two) as desired to detect image frequencies.

In accordance with another embodiment, image channels are handled using data-inversion. For example, the preamble of a channel identified in an RSSI list may be evaluated to determine whether the signal on that channel is inverted or whether a preamble of the signal on that channel is valid. If the preamble is valid, then the receiver can maintain as tuned to the channel and the preamble is followed to an SFD. Alternatively, if it is determined from the preamble that a message is inverted, the receiver may continue to receive data of the message on that channel, but the received data is inverted to recover the message in accordance with an example embodiment. Thus, rather than discarding a channel that includes an inverted preamble, the remaining bits may be inverted to reestablish the true data on that channel.

Figure 7A:
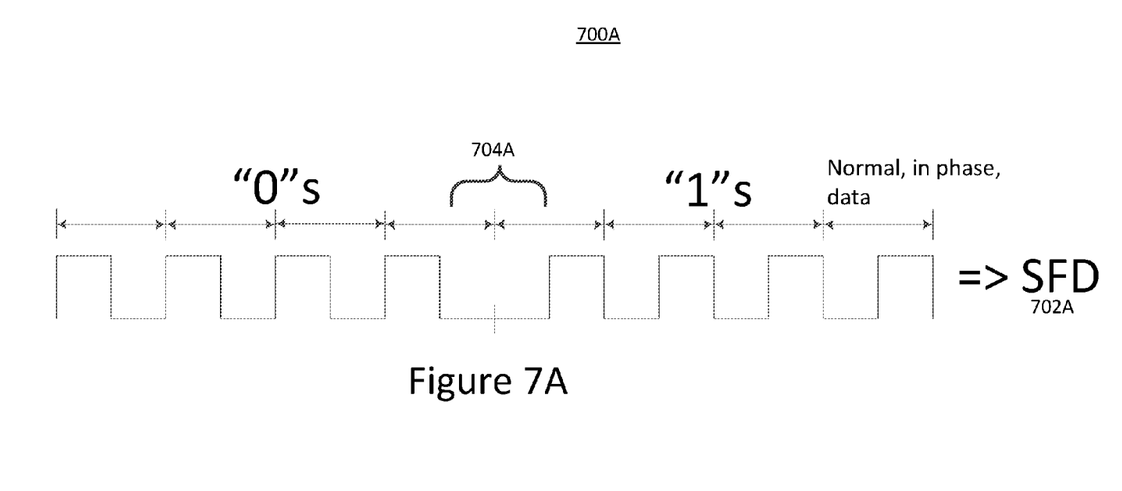
FIGS. 7A and 7B illustrate another method for handling the presence of image frequencies in a multi-hop communication system according in accordance with another embodiment.

By way of example, referring to FIG. 7A, a true preamble 700A includes a series of data "0" Manchester coded bits followed by four bytes of data "1" (inverted preamble) that mark the end of the preamble. In accordance with the illustrated embodiment, the bits are followed by a SFD 702A. As illustrated, the Manchester coded "0" bits transition to the Manchester coded "1" bits a transition 704A. The transition from "0" bits to "1" bits results in a "double-wide" low signal at the transition 704A. In accordance with the illustrated example, after the transition 704A, the balance of the "1" bits (inverted preamble) may be decoded utilizing this phasing information and the SFD 702A can be evaluated based on the receipt of this normal preamble 700A. Thus, the preamble 700A may sample across the double-wide transition 704A if the processing is in phase. The SFD 702A may contain information about a data stream that follows the preamble 700A, for example information about the data rate of the data stream or the like.

Figure 7B:
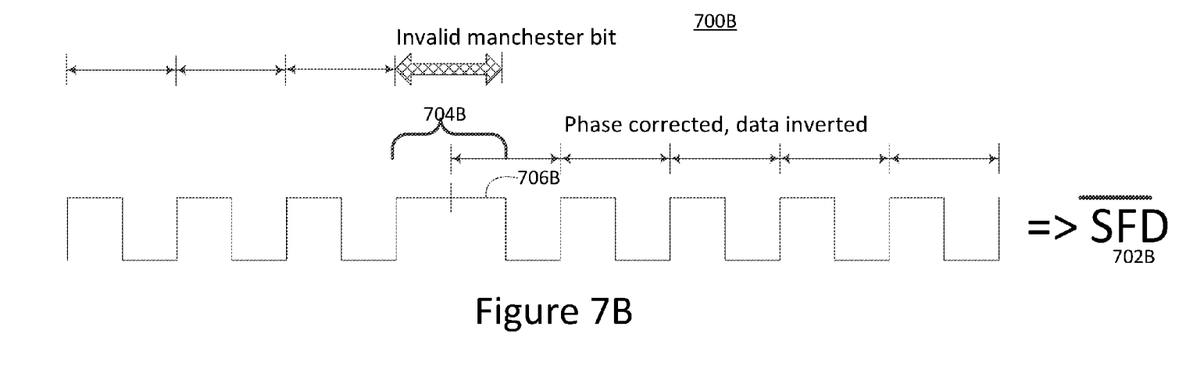

FIG. 7B illustrates an example of an image signal 700B that may be present on a given hop channel. The image signal 700B may be also be referred to as a message 700B or a preamble 700B without limitation. As shown in the illustrated example, the image frequency is characterized by the data being inverted. For example, the illustrated preamble 700B consists of a string of data "1" bits, followed by a transition 704B to four bytes of "0" bits. As illustrated, there is no phase reference for the receiver. Thus, when the receiver first begins to detect the preamble 700B, the receiver may not be able to determine that the preamble 700B is inverted. At the transition 704B to the four byte inverted preamble, as illustrated, there is a double-wide high signal 706B, rather than the low bits that may be encountered in a normal message, such as the preamble 700A. When the image signal is inverted, in addition to the preamble being inverted, the rest of the packet, including an SFD 702B, may be inverted. For example, if the normal preamble 700A on the desired channel ends in an SFD value of hex "BAD1", a data inversion due to an image channel may instead have an SFD value of hex "452E". In accordance with the described embodiment for handling inverted image signals, the receiver uses the detection of the double-wide high signal 706B to determine that the preamble 700B (and the remainder of the data following the preamble) is actually inverted. Rather than discarding the image signal, for example, the receiver can decode the rest of the packet on that channel by inverting the data to reestablish the true data on that channel. For example, an inverted preamble 700B may sample out of phase, but the double-wide signal 706B may become an invalid manchester bit, and thus it may signal to the receiver to adjust the phasing back ½ bit and to invert the data. For example, the data may inverted as it is placed in a buffer.

In accordance with the illustrated embodiment, the receiver may select one of the channels in a plurality of channels in a hop sequence of a multi-hop communication system. The receiver may detect the preamble 700B of a message on the selected channel. For example, the receiver may evaluate a channel in an RSSI list and detect the presence of the preamble 700B. The receiver may determine from a characteristic of the preamble 700B that data of the message is inverted on the selected channel. For example, the receiver follows the preamble 700B to the double-wide transition 704. If the transition 704 is as expected (e.g., two low bits as shown in the example of FIG. 7A), the preamble may be followed by the expected SFD 702A (e.g., hex "BAD1"), and the receiver may continue to decode bits normally. If instead the receiver detects the opposite at the transition 704 (e.g., two high bits as shown in the double-wide high signal 706B of FIG. 7B), and the rest of the preamble 700B is followed by the inverted SFD 702B (e.g., hex "452E") of the expected SFD 702A, then the receiver determines that the signal on this channel is inverted. Rather than discarding this channel and moving to another channel in the RSSI list, the receiver may instead continue to evaluate the balance of the message treating each data bit as inverted. Thus, the receiver may continue to receive the data of the message on the selected channel but the receiver may invert the received data to recover the message. For example, the normal message may be recovered by performing an Exclusive-OR function on each bit with a "1," effectively inverting each bit to recover the true data.

The preambles 700A and 700B illustrated in FIGS. 7A and 7B, respectively, are examples of preambles that may be processed in accordance with the embodiments described above. It will be understood that different sequences of bits may be used as a preamble. It will be understood that other characteristics besides, or in addition, to the double-wide transitions 704 to enable the receiver to determine whether the preamble (and the balance of the message) is inverted or not. The double-wide transitions 704A and 704B in FIGS. 7A and 7B, respectively, is one example of how this may be achieved, but embodiments are not so limited.

In other embodiments, a combination of the channel-switching method illustrated in FIGS. 4-6 and the data-inversion method illustrated in FIG. 7B may be employed. For example, if the channel-switching method finds a valid preamble, but the preamble is inverted, the data-inversion method may still allow a valid message to be received.

Figure 8:
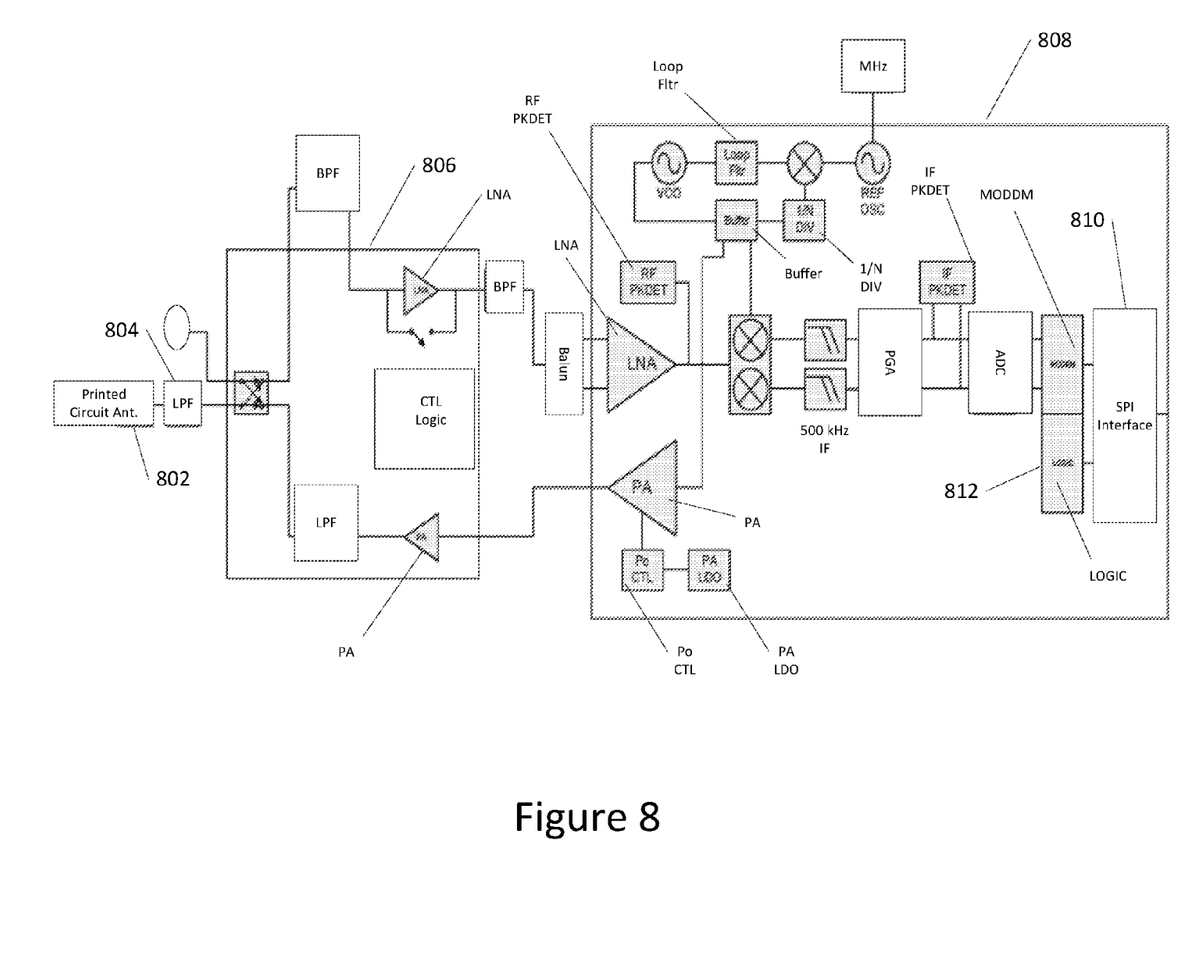
FIG. 8 is a block diagram of an example digital RF receiver which may receive messages in accordance with various embodiments described herein.

FIG. 8 is a block diagram of an example digital RF receiver in which various embodiments described above may be embodied and implemented. As shown, the example digital RF receiver comprises an antenna 802, which may be a printed circuit antenna, which is coupled to an RF transceiver front end module 806 through a low pass filter 804. In one embodiment, the front end module 806 may be implemented using an RF6901 single-chip RF front end module available from RF Micro Devices, Inc. The front end module 806 is coupled to an RF transceiver 808. In this example, on the receive side, the front end module 806 is coupled to the RF transceiver through a band pass filter (BPF) and balun. In one embodiment, the RF transceiver 808 may be implemented using an SI 4461 RF transceiver module available from Silicon Laboratories Inc. In one embodiment, the steps of the methods described above may be performed in the "logic" portion 812 of the transceiver module. In another embodiment, the steps of the methods described above may be performed by an intelligent processor (not shown) connected to the SPI interface 810 of the transceiver 808.

It is understood that any or all of the systems, methods and processes described herein, including the channel-switching and data-inversion methods described and illustrated in FIGS. 4-7B, may be embodied in the form of computer executable instructions (e.g., program code) stored on a computer-readable storage medium which instructions, when executed by a machine, such as a computer, perform and/or implement the systems, methods and processes described herein. For example, a receiver such as an digital RF receiver described above may include a processor and memory coupled to the processor, wherein the memory has stored thereon executable instructions that when executed by the processor cause the processor to effectuate operations as described above. Computer readable storage media include both volatile and nonvolatile, removable and non-removable media implemented in any method or technology for storage of information. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by a computer. As used herein, the term "computer-readable storage medium" does not include signals.

While methods, systems and apparatus have been described and illustrated with reference to specific embodiments, modifications and variations may be made without departing from the principles described above and set forth in the following claims.

What is claimed:

1. A method for receiving a message transmitted on one of a plurality of channels of a hop sequence of a multi-hop communication system, each channel having an associated frequency, the method comprising the steps of:
    scanning the plurality of channels in the hop sequence;
    determining for each of the scanned channels a value indicative of signal strength on the channel;
    tuning a receiver to a first channel of the scanned channels, the first channel having a signal strength value that satisfies a threshold;
    while tuned to the first channel, evaluating the first channel in an attempt to detect a preamble of the message on that first channel;
    if the preamble is detected on the first channel, tuning the receiver to a second channel in the hop sequence and evaluating the second channel in an attempt to detect the preamble on that second channel;
    if no preamble is detected on the second channel, tuning the receiver back to the first channel and receiving a remainder, which includes a start frame delimiter (SFD), of the message on that first channel; and
    if the preamble is detected on the second channel, then maintaining the receiver tuned to the second channel and receiving the remainder of the message on that second channel.

2. The method recited in claim 1, further comprising:
    if no preamble is detected on the second channel, tuning the receiver to a third channel in the hop sequence and evaluating the third channel in an attempt to detect the preamble on that third channel;

if no preamble is detected on the third channel, tuning the receiver back to the first channel and receiving the remainder of the message on that first channel; and if the preamble is detected on the third channel, then maintaining the receiver tuned to the third channel and receiving the remainder of the message on that third channel.

3. The method recited in claim 1, wherein each channel in the hop sequence has an associated frequency that is spaced from the frequency of the next channel in the hop sequence by a same interval.

4. The method recited in claim 1, wherein the frequency of the second channel to which the receiver is tuned is one for which the frequency of the first channel is an image frequency.

5. The method recited in claim 1, wherein the frequency of the second channel to which the receiver is tuned is two hops away from the frequency of the first channel in the hop sequence.

6. The method recited in claim 2, wherein each channel in the hop sequence has an associated frequency that is spaced from the frequency of the next channel in the hop sequence by a same interval.

7. The method recited in claim 2, wherein the frequency of the first channel is an image frequency of at least one of the frequencies of the second and third channels.

8. The method recited in claim 2, wherein the frequency of the second channel to which the receiver is tuned is two hops away from the frequency of the first channel in the hop sequence and the frequency of the third channel is three hops away from the frequency of the first channel in the hop sequence.

9. A receiver comprising:

a processor; and memory coupled to the processor, the memory having stored thereon executable instructions that when executed by the processor cause the processor to effectuate operations comprising:

scanning a plurality of channels in a hop sequence;

determining for each of the scanned channels a value indicative of signal strength on the channel;

tuning the receiver to a first channel of the scanned channels, the first channel having a signal strength value that satisfies a threshold;

while tuned to the first channel, evaluating the first channel in an attempt to detect a preamble of a message on that first channel;

if the preamble is detected on the first channel, tuning the receiver to a second channel in the hop sequence and evaluating the second channel in an attempt to detect the preamble on that second channel;

if no preamble is detected on the second channel, tuning the receiver back to the first channel and receiving a remainder, which includes a start frame delimiter (SFD), of the message on that first channel; and if the preamble is detected on the second channel, then maintaining the receiver tuned to the second channel and receiving the remainder of the message on that second channel.

10. The receiver as recited in claim 9, the memory having stored thereon further executable instructions that when executed by the processor cause the processor to effectuate further operations comprising:

if no preamble is detected on the second channel, tuning the receiver to a third channel in the hop sequence and evaluating the third channel in an attempt to detect the preamble on that third channel;

if no preamble is detected on the third channel, tuning the receiver back to the first channel and receiving the remainder of the message on that first channel; and if the preamble is detected on the third channel, then maintaining the receiver tuned to the third channel and receiving the remainder of the message on that third channel.

11. The receiver as recited in claim 9, wherein each channel in the hop sequence has an associated frequency that is spaced from the frequency of the next channel in the hop sequence by a same interval.

12. The receiver as recited in claim 11, wherein the frequency of the second channel to which the receiver is tuned is one for which the frequency of the first channel is an image frequency.

13. The receiver as recited in claim 11, wherein the frequency of the second channel to which the receiver is tuned is two hops away from the frequency of the first channel in the hop sequence.

14. The receiver as recited in claim 10, wherein each channel in the hop sequence has an associated frequency that is spaced from the frequency of the next channel in the hop sequence by a same interval.

15. The receiver as recited in claim 11, wherein the frequency of the first channel is an image frequency of at least one of the frequencies of the second and third channels.

16. The receiver as recited in claim 11, wherein the frequency of the second channel to which the receiver is tuned is two hops away from the frequency of the first channel in the hop sequence and the frequency of the third channel is three hops away from the frequency of the first channel in the hop sequence.

* * * * *